July 18, 1961    W. A. GAIL    2,992,816
TEMPERATURE COMPENSATED LIQUID SPRING
Filed May 16, 1957

INVENTOR.
WILLIAM A. GAIL
BY
*John E. Reufer*
ATTORNEY

United States Patent Office 2,992,816
Patented July 18, 1961

2,992,816
TEMPERATURE COMPENSATED LIQUID SPRING
William A. Gail, Moreland Hills, Ohio, assignor to Cleveland Pneumatic Industries, Inc., a corporation of Ohio
Filed May 16, 1957, Ser. No. 659,719
3 Claims. (Cl. 267—64)

This invention relates generally to liquid springs and more particularly to a new and improved temperature compensated liquid spring mechanism.

It is an important object of this invention to provide a liquid spring incorporating novel means to compensate for temperature changes so that the spring will operate properly under wide temperature ranges.

It is another object of this invention to provide a liquid spring including means to insure that the proper pre-charge pressure is contained within the spring regardless of the environmental temperature.

Still another object of this invention is to provide a liquid spring including mechanical means for operating a normally open valve which opens each time the spring moves to the extended position, which valve provides fluid communication between the liquid spring chamber and a source of constant pressure liquid.

Further objects and advantages will appear from the following descriptions and drawings, wherein.

In liquid springs a variable volume cavity is provided which is completely filled with liquid that is compressed to provide the resiliency for spring operation. Because the volume of liquid does not change greatly when it is compressed, large pressure changes and in turn large spring force changes occur with a relatively small volumetric change of the liquid. Because the compression rate of the liquid is relatively small, it becomes quite sensitive to temperature changes which change the pre-charge pressure of the device. In most cases the pre-charge pressure is in the order of 1,000 p.s.i., and maximum pressures in the range of 40,000–60,000 p.s.i. occur when the spring is in the fully compressed position. If the pre-charge pressure varies substantially from the designed pre-charge pressure the entire stroke characteristics of the spring change drastically. Such changes in the pre-charge pressure will occur in an uncompensated spring when the environmental temperature changes. It is therefore important to provide temperature compensation for liquid springs installed in aircraft since they must function over wide temperature ranges which occur due to altitude and climatic changes.

In a compensated liquid spring according to this invention means are provided to release liquid when the pre-charge pressure of the spring increases or supply additional liquid when the pre-charge pressure decreases. In addition, any liquid lost due to leakage is automatically replaced each time the spring moves to the extended position.

Figure 1:
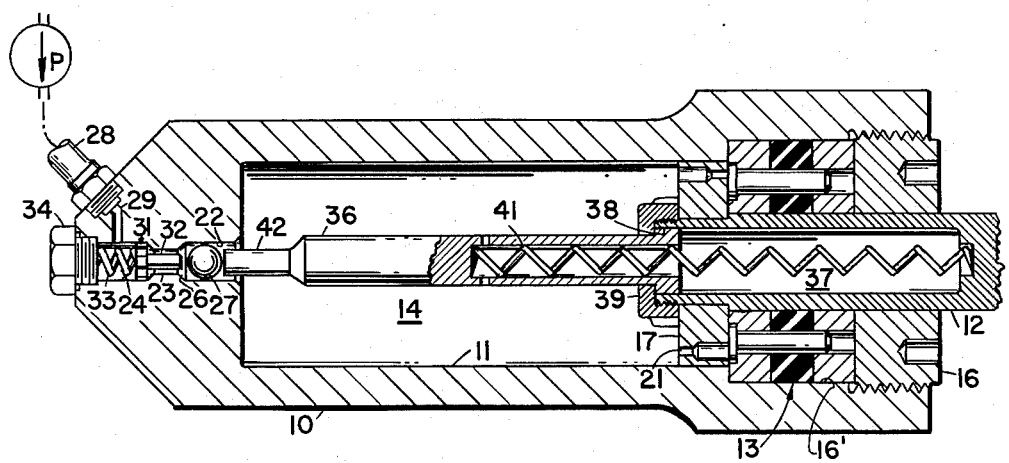
FIGURE 1 is a side elevation in longitudinal section showing a liquid spring incorporating this invention in the extended position, at which time fluid communication is provided between the spring and a source of pressure fluid.

Referring to the drawings, FIGURE 1 shows one embodiment of a preferred liquid spring according to this invention wherein the spring per se includes a cylinder body 10 formed with an axial bore 11 into which a plunger 12 projects. Seal means 13, of the type disclosed in the United States patent to Bingham, Patent No. 2,308,149, extend between the cylinder 10 and plunger 12 and cooperate with the cylinder body 10 and plunger 12 to define a liquid filled cavity 14. The seal 13 is securely mounted within a counter bore 16' of the cylinder body 10 and is retained therein by a gland nut 16 threaded into its open end.

Figure 2:
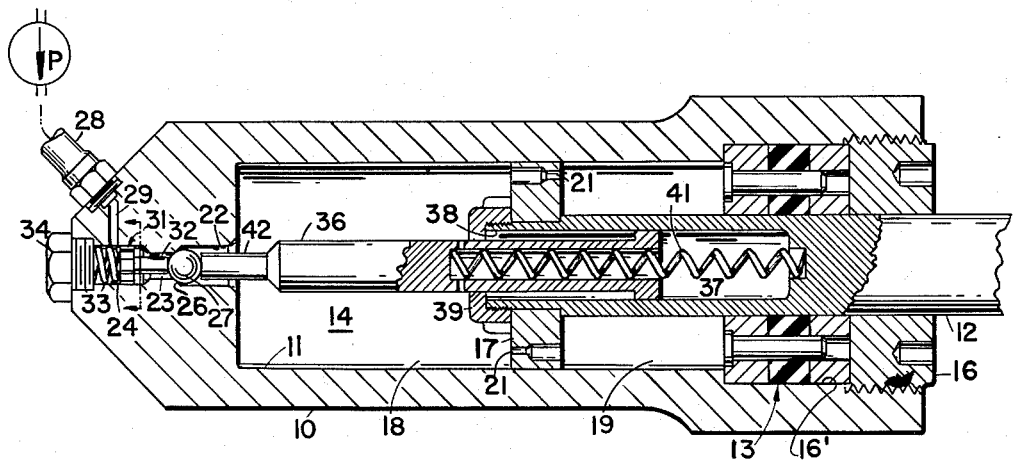
FIGURE 2 is a view similar to FIGURE 1 showing the position the elements assume when the spring is compressed, at which time the spring chamber and the source of pressure fluid are isolated; and, FIGURE 3 is an enlarged cross section taken along 3—3 of FIGURE 2.

Mounted on the plunger 12 is a piston head 17 which divides the cavity 14 into first and second chambers 18 and 19 best seen in FIGURE 2. When the plunger moves to the left from the position of FIGURE 1 the total volume of the cavity 14 is reduced by the volume change of the plunger 12 within the cavity 14 thereby compressing the liquid contained therein to a higher pressure. As this occurs the piston head 17 reduces the volume of the chamber 18 and increases the volume of the chamber 19. Such change in volumes produces a differential pressure across the piston head 17 which produces flow through the damping orifices 21 formed in the piston head 17. The flow of the liquid through the damping orifices results in an energy absorption which dynamically resists movement of the plunger 12. When the plunger 12 comes to rest, however, the pressure within the two chambers 18 and 19 equalizes and only the pressure effect of the liquid within the spring acting upon the plunger 12 becomes significant. It should be understood that the cavity 14 includes both of the chambers 18 and 19 and its volume is equal to the sum of the volumes of the two chambers. Thus far the operation of the spring is essentially standard.

In order to provide temperature compensation, valve means are located in the left end of the cylinder body 10 to provide fluid communication between a source of pressure fluid P and the cavity 14 only when the spring is in the extended position shown in FIGURE 1. The source of pressure fluid P can be any suitable pump or any equivalent device which supplies liquid at a constant predetermined pressure. The cylinder 10 is formed with a valve bore 22 open at its inner end to the axial bore 11, a coaxial connecting bore 23 of smaller diameter, and a spring bore 24 having a diameter larger than the connecting bore 23. A valve seat 26 is formed by the transition between the valve bore 22 and the connecting bore 23 against which a ball valve 27 is adapted to seat with sealing engagement. The ball valve 27 is loosely positioned within the valve bore 22 and is axially movable between an unseated position shown in FIGURE 1 and a seated position shown in FIGURE 2. The spring bore 24 is connected to a pressure line 28 by a passage 29. The pressure line 28 in turn connects with the source of pressure fluid P so when the ball valve 27 is in the unseated position of FIGURE 1 fluid communication is provided between the source of pressure fluid P and the cavity 14.

Figure 3:
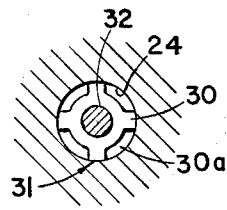

To urge the ball valve 27 to the unseated position of FIGURE 1 I provide a valve operator 31 formed with a stem 32 which extends through the connecting bore 23 and engages the ball valve 27, the diameter of the stem being materially smaller than that of the bore 23, and a head portion 30 shown in FIGURE 3. The head portion 30 is formed with reliefs 30a so that fluid can always bypass the valve operator 31. A spring 33 extends between the head portion 30 and a plug 34 which closes the outer end of the spring bore 24. Thus the spring 33 biases the ball valve 27 toward the unseated position, but it permits movement of the ball valve to the seated position when the force of the spring 33 is overcome.

In order to close the ball valve 27 when the plunger 12 moves from the extended position I provide a plunger extension 36 which extends into a central bore 37 formed in the plunger 12. The plunger extension 36 is formed with a shoulder 38 which engages a flanged nut 39. When the plunger 12 is in the extended position of FIGURE 1 the shoulder 38 engages the flanged nut 39 so the plunger extension 36 is mechanically restrained against movement relative to the plunger 12 to the left beyond this position. A spring 41 extends between the plunger 12 and the plunger extension 36 and resiliently biases the plunger extension to the left toward the ball valve 27. The plunger extension 36 is formed with a reduced end portion 42 which extends into the valve bore 22 and is adapted to engage the ball valve 27, and the various proportions are arranged so that the end portion 42 permits the ball valve 27 to move away from the valve seat 26 when plunger 12 is in the extended position. When, however, the plunger 12 moves toward the telescoped position the end portion 42 pushes the ball valve 37 into engagement with the seat 26 under the influence of the spring 41. The two springs 33 and 41 should be sized so that the force of the spring 41 is sufficient to overcome the force of the spring 33 and move the ball valve 27 into engagement with its seat 26 as soon as the plunger 12 moves away from the extended position. It is also necessary to size the spring 33 so that it will produce enough force to open the valve upon extension of the plunger even if the pre-charge pressure is high due to increase in liquid temperature.

In operation the source of pressure P is maintained at the desired pre-charge pressure by any suitable means such as a pump. If the temperature of the liquid within the chamber of the cavity 14 increases causing an increase in pressure therein, this pressure will be relieved, as soon as the plunger moves to the extended position, by flow out past the ball valve 27 to the source of pressure P. It should be understood that each time the plunger 12 moves to the extended position the ball valve 27 is moved away from its seat by the spring 33 so that excessive pressure within the cavity 14 can be relieved. If, however, the temperature of the liquid within the cavity 14 is reduced causing a decrease in the pressure within the cavity 14, additional liquid will be supplied from the source of pressure P to compensate for this temperature drop as soon as the valve is permitted to open by movement of the plunger to the extended position. Those skilled in the art will recognize that each time the plunger 12 moves to the extended position the valve is open and the pressure within the cavity 14 is automatically adjusted to the proper value and that flow of liquid through the valve can take place in either direction. Therefore full compensation is provided for both temperature increases, temperature decreases, and liquid will be supplied to replace any lost by leakage. As soon as the plunger 12 moves from the extended position the ball valve 27 is automatically closed and the liquid spring operates in the conventional manner. A valve of the type shown is preferable because the sealing force of engagement between the ball valve 27 and the seat 26 is a function of the pressure differential across the valve. Therefore the sealing force produced by pressure increases as the pressure increases. Also the force developed by the spring 41 is a function of the compression of the spring and increases as the plunger moves toward the compressed position. Therefore the force of spring 41 augments the sealing with a force which is a function of the pressure within the cavity 14. Because the valve is automatically opened mechanically when the plunger moves to the extended position and automatically mechanically closed when the plunger moves away from the extended position complete reliability is achieved.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description is determinative of the scope of the invention.

I claim:

1. A liquid spring comprising a cylinder formed with a bore open at one end, a plunger projecting into the open end of said bore axially movable relative to said cylinder between an extended and a telescoped position, seal means between said cylinder and plunger cooperating therewith to define a liquid filled cavity the volume of which is reduced by movement of said plunger away from said extended position, a source of liquid under pressure, a passage in said cylinder providing communication between said source and cavity, a valve seat around said passage on the side thereof adjacent to said cavity, a valve element movable into engagement with said seat isolating said source and cavity upon such engagement, resilient means between said valve and said cylinder biasing said valve element away from said seat, and a valve operator carried by said plunger engageable with said valve element only when said plunger is in positions spaced from said extended position to overcome said resilient means and move said valve element into engagement with said valve seat.

2. A liquid spring comprising plunger and cylinder members cooperating to define a cavity filled with liquid under pressure the volume of which is changed by relative axial movement between said members from an extended to a telescoped position, a source of liquid pressure, valved means connected between said source and cavity including a valve element movable to a closed position wherein it isolates said source and cavity, the liquid pressure in said chamber producing a first source on said valve element urging it towards a closed position, first means producing a second force urging said valve element away from said closed position with a force greater than said first force when said plunger is in said extended position, a mechanical element mounted in said cavity for movement into operative engagement with said valve element, and means connecting said mechanical element and at least one of said members operative to cause such engagement between said mechanical element and valve element moving said valve element to the closed position in response to movement of said plunger to positions spaced from said extended position.

3. A liquid spring comprising a cylinder formed with a bore open at one end, a plunger projecting into the opend of said bore axially moveable relative to said cylinder between an extended and a telescoped position, seal means between said cylinder and plunger cooperating therewith to define a liquid filled cavity the volume of which is reduced upon movement of said plunger away from said extended position, a source of liquid under pressure, a normally open valve including a valve element connecting said source and cavity, a mechanical valve operating element mounted on said plunger engageable with said valve element closing said valve when said plunger moves away from said extended position.

References Cited in the file of this patent

UNITED STATES PATENTS

| | | |
|---|---|---|
| 2,327,021 | Cushman | Aug. 17, 1943 |
| 2,566,736 | Levy | Sept. 4, 1951 |
| 2,581,856 | Gruss | Jan. 8, 1952 |
| 2,620,182 | Marston et al. | Dec. 2, 1952 |
| 2,773,517 | Hooper et al. | Dec. 11, 1956 |
| 2,819,728 | Gage et al. | Jan. 14, 1958 |

FOREIGN PATENTS

| | | |
|---|---|---|
| 158,574 | Great Britain | Nov. 17, 1921 |
| 685,469 | Great Britain | Jan. 7, 1953 |